(12) United States Patent
Scarpati et al.

(10) Patent No.: US 11,715,070 B2
(45) Date of Patent: Aug. 1, 2023

(54) PREDICTING UPCOMING MISSED CLOCKINGS AND ALERTING WORKERS OR MANAGERS

(71) Applicant: KRONOS TECHNOLOGY SYSTEMS LIMITED PARTNERSHIP, Lowell, MA (US)

(72) Inventors: Michael A. Scarpati, Wellesley, MA (US); Thomas J. Walsh, Melrose, MA (US); Gregory Lamarre Anderson, Westford, MA (US)

(73) Assignee: Kronos Technology Systems Limited Partnership, Lowell, MA (US)

( * ) Notice: Subject to any disclaimer, the term of this patent is extended or adjusted under 35 U.S.C. 154(b) by 238 days.

(21) Appl. No.: 16/381,472

(22) Filed: Apr. 11, 2019

(65) Prior Publication Data

US 2019/0318320 A1 Oct. 17, 2019

Related U.S. Application Data

(60) Provisional application No. 62/656,589, filed on Apr. 12, 2018.

(51) Int. Cl.
*G06Q 10/1091* (2023.01)
*G06Q 10/0639* (2023.01)

(52) U.S. Cl.
CPC ... *G06Q 10/1091* (2013.01); *G06Q 10/06393* (2013.01)

(58) Field of Classification Search
CPC .............. G06Q 10/06; G06Q 10/1091; G06Q 10/06393; G06Q 10/063114; G06Q 10/0635; G06Q 10/0639; G06Q 30/0264; G06Q 40/125; G06Q 30/0218; G06Q 10/06375; H04L 41/0631; H04W 4/021; H04W 4/80; G06K 7/00; G21Y 2002/208; G21Y 2002/303; H04M 1/72566; H04M 3/565; Y02B 20/42; G07C 1/14; H04N 21/4826

See application file for complete search history.

(56) References Cited

U.S. PATENT DOCUMENTS 9,070,162 B2 * 6/2015 Cherry .................... G06Q 40/00
9,876,825 B2 * 1/2018 Amar ...................... H04L 63/10
(Continued)

*Primary Examiner* — Peter Ludwig
*Assistant Examiner* — Avia Salman
(74) *Attorney, Agent, or Firm* — GTC Law Group PC & Affiliates

(57) ABSTRACT

Workers often forget to enter clockings indicating when they have arrived or left work or transferred between work activities. Various embodiments provide a system that predicts the risk of potential missed worker clockings and delivers alerts to the workers and/or their managers when that risk is high. The system analyzes historical data to find previous instances of missed clockings at an organization, extracts feature information regarding the context of the missed clockings, and calibrates a missing clocking risk model. The model is then used in either an online or batch mode to predict the risk of workers missing upcoming scheduled clockings. Based on these risk scores and system configurations, alerts are generated for employees and managers reminding them about the upcoming clockings and lowering the amount of missed clockings and subsequent remedies.

23 Claims, 12 Drawing Sheets

(56) References Cited

U.S. PATENT DOCUMENTS

| | | | |
|---|---|---|---|
| 2011/0258153 A1* | 10/2011 | Kamar | G06Q 10/109 706/46 |
| 2014/0096249 A1* | 4/2014 | Dupont | G06F 21/00 726/23 |
| 2016/0104077 A1* | 4/2016 | Jackson, Jr. | G06N 7/005 706/12 |
| 2016/0192325 A1* | 6/2016 | Borras | H04L 41/069 455/567 |

* cited by examiner

| Persona Method/Device | Low Severity | High Severity | ... |
|---|---|---|---|
| Worker SMS/Phone | | X | |
| Worker App-Push Tablet | X | | |
| Worker Email/All Devices | X | | |
| Worker Preferred Device | | X | |
| Manager SMS/Phone | | X | |
| Manager Email/All Devices | X | | |
| Manager Preferred Device | | X | |

Figure 9

PREDICTING UPCOMING MISSED CLOCKINGS AND ALERTING WORKERS OR MANAGERS

STATEMENT REGARDING FEDERALLY SPONSORED RESEARCH OR DEVELOPMENT

N/A

BACKGROUND OF THE INVENTION

Various embodiments relate generally to predictive systems, methods, devices and computer programs and, more specifically, relate to using machine learning to predict the risk of a worker missing their clocking and delivering alerts to the worker or their manager.

This section is intended to provide a background or context. The description may include concepts that may be pursued but have not necessarily been previously conceived or pursued. Unless indicated otherwise, what is described in this section is not deemed prior art to the description and claims and is not admitted to be prior art by inclusion in this section.

Worker clockings (also known as "punches") are a critical component of labor timekeeping systems. These clockings 112 are entered on timecards 110 by workers into a mechanical timekeeping system to indicate the exact day and time the worker arrived for work, left work, took a break, switched activities, or any other timekeeping event. However, workers often forget to enter these clockings, leading to a "missed clocking" 114 that needs to be fixed manually with edited clockings 124 by a manager in order to make the employee's timecard valid 120 (see FIG. 1). In some embodiments, an employee cannot be paid for their labor if a missed clocking remains on their timesheet, and even if they can be paid, the payment will often be incorrect if a missed clocking is present. Therefore, there is substantial business and human value to preventing missed clockings from occurring in the first place.

BRIEF SUMMARY OF THE INVENTION

The below summary is merely representative and non-limiting.

The above problems are overcome, and other advantages may be realized, by the use of the embodiments.

Various embodiments provide a system that predicts the risk of potential missed worker clockings and delivers alerts to the workers and/or their managers when that risk is high. Missing clockings occur when a worker who is supposed to make a timecard entry to indicate they have arrived at or are leaving from work (finished or on a break), does not clock within a certain grace period around the scheduled time, even though they were present to do so. Such missed clockings can be costly to a manager, worker, or organization as the timecard entries need to be edited after the fact to reflect the worker's actual time worked.

Such a system uses a machine learning method to predict the likelihood of a missed clocking based on features of the worker, their organizational units, and the day/time. In particular, features from important categories are extracted from timekeeping and scheduling information available before the worker's scheduled clocking. These features include, but are not limited to, organizational features indicating what department, location, and other properties an employee has, features capturing the employee's scheduling and timekeeping history, features capturing the record of this employee conditional on date and time features, and the date and time features for the scheduled clocking. This information is extracted not just for upcoming clockings, but also from the historical record.

The historical data is used to calibrate the risk prediction system based on statistical correlations of the extracted features and previously recorded missing clockings. In one embodiment, a machine learning algorithm such as gradient boosted decision trees (GBDT) is trained using the features described above as inputs and the occurrence of a missed clocking or a non-missed clocking as the variable to be predicted. An important nuance of this system, illustrated in FIGS. 3 and 4, is that the labeling of each scheduled clocking as missed or non-missed needs to be performed before the model can be trained. Therefore, in some embodiments, this labeling needs to be done with a heuristic algorithm that compares multiple versions of the timekeeping data and determines if a clocking was missed or not. Once this labeling is completed, the machine learning algorithm can be used to create the risk score model.

As seen in FIG. 2, after the "training" phase using historical data, the model is deployed to score the risk of future scheduled clockings. These predictions can either be made in an "online" mode, updating the features after every timekeeping and scheduling event, or in a "batch" mode where the next day's (or week's, etc.) scheduled clockings are assessed once before the day starts. Further details are available in the lower-level illustrations in FIG. 3 or 4 or in the detailed description.

In either the batch or online modes, the result of the prediction phase is a risk score for every scheduled clocking for every worker in the organization. The system then uses these risk scores to determine if an alert should be sent to an employee, or their manager, or both. The alerting system is configurable with a set of parameters including but not limited to thresholds on the risk score set by the organization, parameters controlling how often or when an employee or manager should receive alerts, their preferred devices, and how often alerts should repeat without acknowledgement. These configuration parameters and the risk scores themselves allow the system to be tuned to only send alerts when there is a high risk of a missed clocking, thereby limiting false positives and unnecessary alerts. Alternative configurations may choose to send alerts at moderate risk scores to reduce false negatives at the cost of sending additional alerts.

The alerts are delivered to an employee or manager's device, such as a mobile smartphone or tablet. Some of the parameters of the alerting system may specify particular devices where an alert with certain properties should be delivered. In some embodiments, certain alerting parameters may be calculated on the device itself, as highlighted in FIG. 10. In either case, the alerts are delivered to employees and managers, who are asked to acknowledge them with a response such as "OK" or "Incorrect Schedule". These alerts are intended to remind or employees or managers to ensure timely clockings.

BRIEF DESCRIPTION OF THE SEVERAL VIEWS OF THE DRAWINGS

Aspects of the described embodiments are more evident in the following description, when read in conjunction with the attached Figures.

FIG. 9 presents an example configuration of methods and devices for alert delivery based on user type and the severity of the alert.

DETAILED DESCRIPTION OF THE INVENTION

Figure 1:
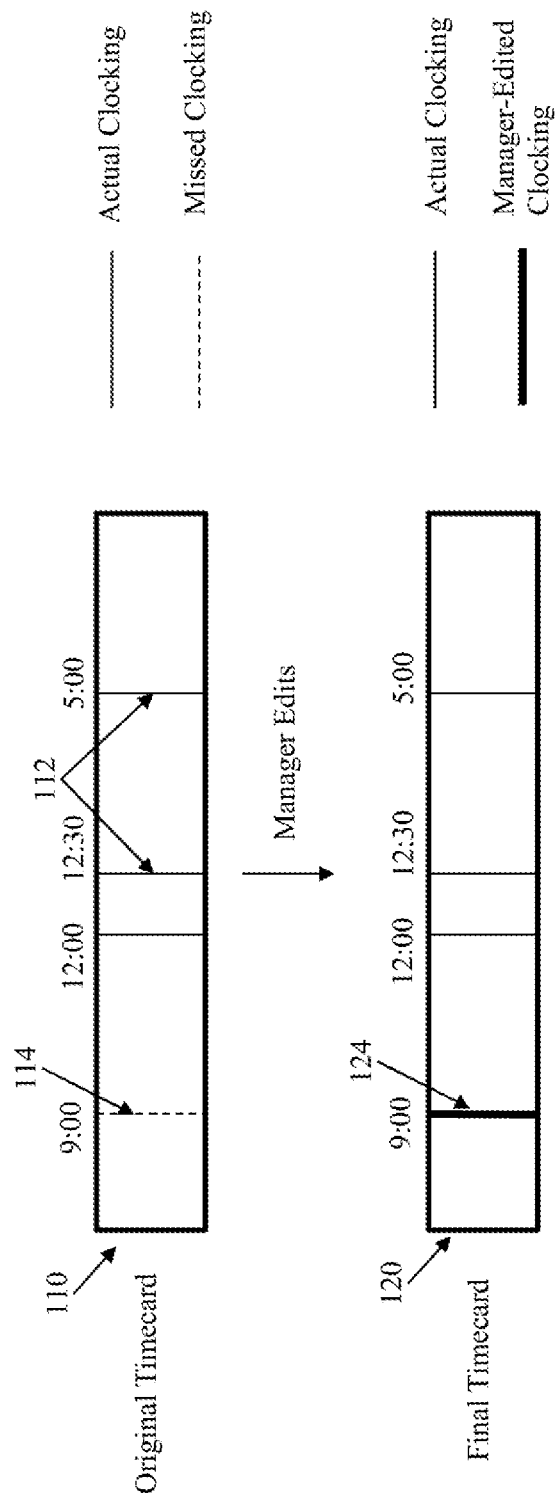
FIG. 1 illustrates an example of a missing clocking that is later fixed by a manager edit to a timecard.

This patent application claims priority from US Provisional Patent Application No. 62/656,589, filed Apr. 12, 2018, the disclosure of which is incorporated by reference herein in its entirety.

Various embodiments provide a system to alert employees or their managers when the employee is at a high risk of missing a clocking. Clockings in a workforce timekeeping system are timestamps indicating when an employee came to work, left or returned from a break, transferred to another part of their work, or left work. These clockings are used across industries to determine how much time an employee has worked, and subsequently how much they should be paid. However, because clockings are manually input by the employee to a time clock, terminal, or other device, employees often forget or fail to enter their clockings, creating a missed clocking.

In some embodiments, an employee cannot be paid for their labor if a missed clocking remains on their timesheet, and even if they can be paid, the payment will often be incorrect if a missed clocking is present. Therefore, there is substantial business and human value to preventing missed clockings from occurring in the first place. In addition to ensuring proper payment of employees, missing clockings also cause substantial work for managers and payroll administrators who must determine proper actions to take, including filling in the missing clockings with appropriate timestamps.

A system that alerts users to the risk of missing clocking improves over systems that create reports or flag missed clockings in historical data by potentially avoiding these misses altogether. Such an alerting system also extends the scope of prediction and alerting systems to the area of timekeeping clockings. A missing clocking alerting system benefits from using computerized algorithms because of the size of the data that needs to be processed, including potentially tens of millions of historical clockings and schedule entries. Using parallel computing as in FIG. 7 can also increase the speed and efficiency of alerts, which may need to be generated fairly rapidly based on incoming events.

Importantly, missed clockings often follow patterns. Particular employees, departments, or clockings at specific times of the day or on particular days of the week can all be more or less at risk. Quantifying that risk and using it to alert workers or managers about expected missed clockings could decrease the number of actual missed clockings, thereby saving organizations time, money, and making pay processes based on the clockings more efficient and reliable.

Machine learning algorithms can be used to calibrate models based on historical data. In the context of missed clockings, this means building a model that quantifies the risk of a particular clocking being missed. The model is calibrated based on historical data and then applied to features that characterize the scheduled clocking. Unlike hand-tuned, rule-based, or heuristic risk prediction systems, machine learning systems tailor the model to historical data, meaning the model will likely make different risk prediction scores under the same context at different organizations.

Alerting systems are traditionally used in timekeeping and scheduling systems to alert managers and employees of inconsistencies after an event has already occurred. For instance, prior works raise alerts when an employee works beyond a given time limit or other timekeeping violations. However, such alerts are rarely raised before an event takes place, except in the case of projected total hours calculations, which are merely deterministic sums performed based off of past events and scheduled time in the future. By contrast, various embodiments provide a system that raises alerts based on a risk score dynamically generated based on historical trends and assigned to a future event before it has happened.

Figure 2:
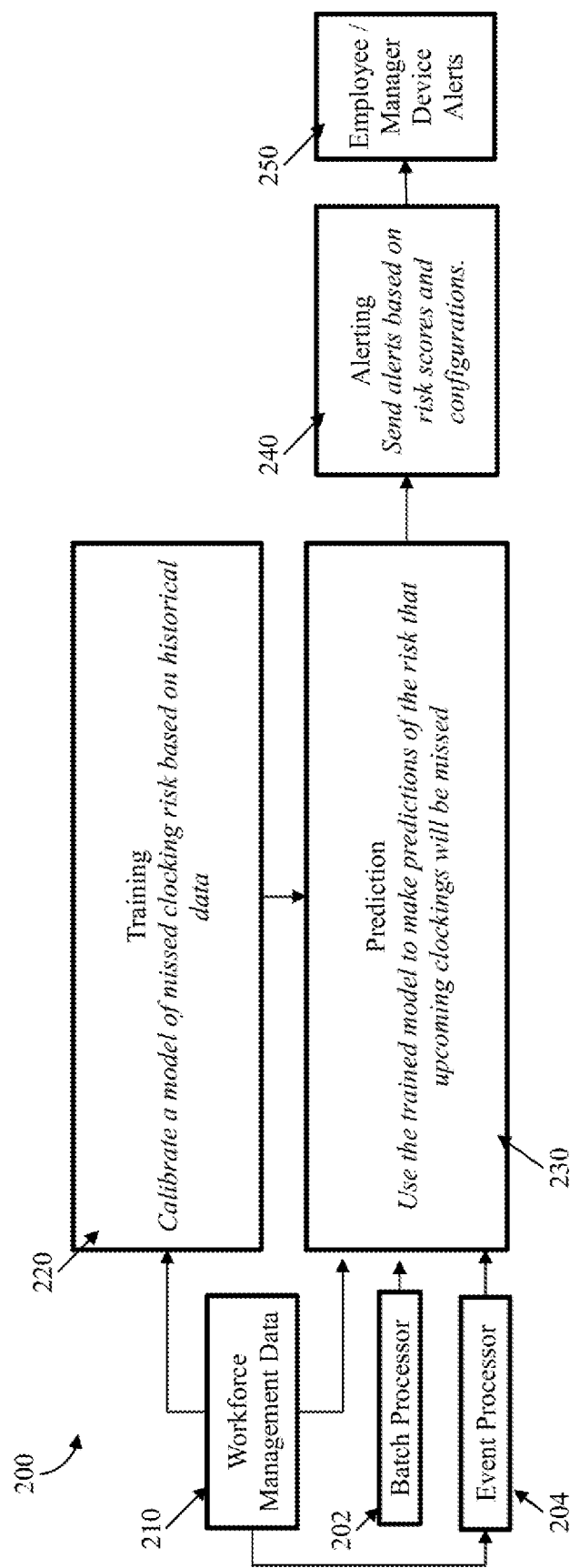
FIG. 2 illustrates the risk prediction and alerting system at a high level, focusing on the major components that calibrate the model, predict, and handle alerting.
Figure 3:
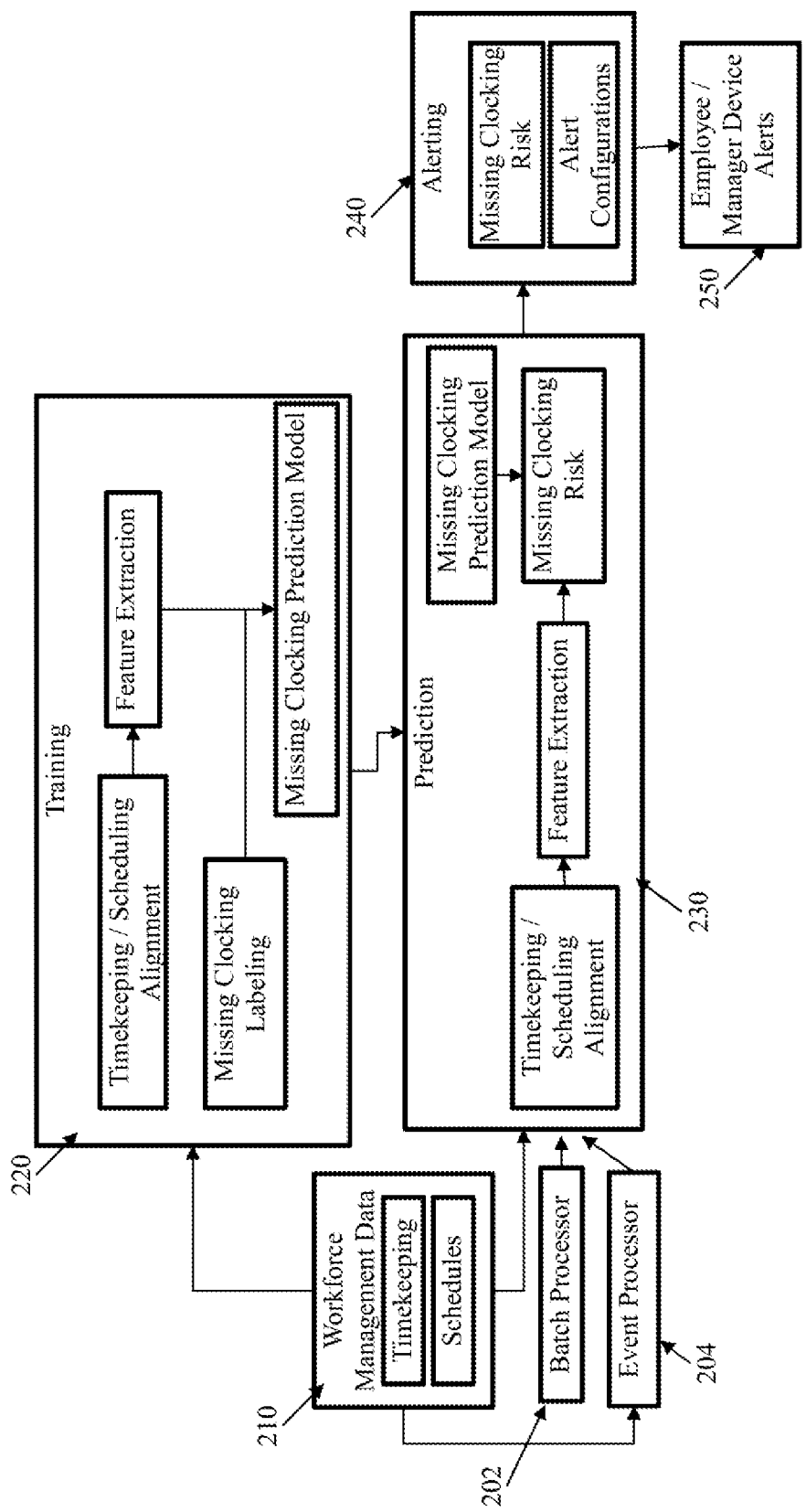
FIG. 3 illustrates the risk prediction and alerting system at a mid-level, showing the control and data flow between major subcomponents.

A system 200, such as that seen in FIGS. 2-4, starts with data from a timekeeping and scheduling system. A batch processor 202 or event processor 204 may begin the process. Historical data 210 from the timekeeping and scheduling components indicates the times workers were scheduled to clock, and the times that they actually clocked, including the entry times for those clockings. From this data, some embodiments may directly, or with a heuristic procedure described later, extract labels of which clockings were missed and which ones were properly executed. After the labeling stage, the historical timekeeping and scheduling data is used to create features describing the context of every clocking, such as what day the clocking occurred on or how often an employee has missed clockings recently on the same day of the week. These features and the labeled clockings are then sent to a machine learning algorithm that builds a model for the risk of a missing clocking given features extracted from timekeeping and scheduling data 220. This model is then deployed in either a batch or online mode to make predictions of the risk that future clockings will be missed 230. These predicted risks are used to send alerts to either the employee or their manager through 240/250, in some embodiments, push notifications to mobile devices reminding them about the upcoming clocking. These alerts have many configurable parameters to tradeoff between increase capture of missed clockings and minimizing unwanted alerts.

Timekeeping and Scheduling Data

The system consumes timekeeping and scheduling data from a workforce management system. Specifically, timekeeping data in some embodiments include but are not limited to the elements listed in Table 1.

TABLE 1

Timekeeping data fields

| Field | Description |
| --- | --- |
| Employee number | Unique identifier for the clocking employee |
| Clocking time | The time that the clocking is assigned to |
| Clocking entry time | The time that the clocking was actually entered into the system (for instance a clocking may be entered for the previous day after a missed clocking) |
| Organizational Information | Information about the part of the organization the employee was working in or reporting to at the time of the clocking |
| Deletion Information | Information about the timing of any edits or deletions to the clocking |

Scheduling data in some embodiments include but are not limited to the following elements listed in Table 2.

TABLE 2

Scheduling data fields

| Field | Description |
| --- | --- |
| Employee number | Unique identifier for the scheduled employee |
| Shift scheduled start date/time | The time that the shift is scheduled to begin. |
| Shift scheduled end date/time | The time that the shift is scheduled to end |
| Break date/times | Date and timing information for scheduled breaks or job transfers |
| Shift entry time | The time the scheduled shift was entered into the system |
| Organizational Information | Information about the part of the organization the employee was working in or reporting to at the time of the scheduled shift |
| Deletion Information | Information about the timing of any edits or deletions to the scheduled shift |

Timekeeping and Scheduling Alignment

In order to extract the features of each employee's timekeeping record at the time of an expected clocking, the system performs an alignment of the timekeeping and scheduling data, indicating when clockings were expected, and what the state of the employee's timekeeping and scheduling records were at those times. In some embodiments, the procedure for this alignment (see Timekeeping/Scheduling Alignment in the top left and bottom left of FIG. 4) is as follows:

First, the historical clockings and scheduled clockings are loaded into tabular representations in computer memory. The schedule as it exists 3 hours before the shift to be worked is used because schedules can be changed both before and after a shift is worked (see Daily Schedule blocks in FIGS. 4 and 5). Identifiers of whether a clocking was missed, and the features associated with the clockings, must be assigned to the scheduled clockings only, as actual clockings cannot be used to drive alerts; if they are missed, nothing would exist to trigger the alert. In order to align scheduled clockings to actual clockings, a one-hour threshold is used whereby a clocking is assigned to a scheduled clocking if they are within one hour of each other. If no clockings exist within one hour (whether executed properly or initially missed), the scheduled clocking is removed from the training data after features have been computed (Between the Feature Extraction block and the Historical Features block in FIGS. 4 and 5). The aligned clockings are then used to generate feature data (see the link from "Aligned Schedule/Clockings" to Feature extraction in FIGS. 4 and 5). To transfer label assignments from historical clockings to a scheduled counterpart, a scheduled clocking is labeled as missed if there exists a missed historical clocking within one hour before or after the scheduled time (see the link from Aligned Schedule/Clockings" to "Historical Missed Clockings" in FIGS. 4 and 5).

Note, this alignment is performed in two different parts of the missing clocking prediction process (see Timekeeping/Scheduling Alignment blocks in FIGS. 3 and 4). It is used to align the historical data needed to train the machine learning model and it is also used to align the current data used to make a risk prediction. In order to maintain high levels of accuracy, the process is the same for both periods. Because certain data will not be available at prediction time, features explained in the following section are careful to only make use of data that would be available in both settings.

Feature Extraction

The next step in the process requires extracting features from the aligned timekeeping and scheduling data. These features capture the general context of the worker's scheduling and timekeeping data at each scheduled clocking time. In one embodiment, the features fall into categories (see below and Feature Extraction blocks in FIGS. 4 and 5), including but are not limited to, organizational features indicating what department/location and other properties pertain to an employee, features capturing the employee's scheduling and timekeeping history, features capturing the record of this employee conditional on date and time features, and the date and time features for the scheduled clocking. Table 3 lists out features from these categories in one embodiment of the system. Each of these features is designed to capture an element of the context that will aid in predicting whether a particular clocking will be missed or not.

TABLE 3

Extracted features

| Feature | Category | Description |
| --- | --- | --- |
| Miss rate in this employee's various organizational levels | Organizational | The model will generally include features for a number of different organizational levels, including those corresponding to Location, Department, and Job. |
| Miss rate in this employee's home organizational account | Organizational | Average rate of missing clockings in the last 28 days for this employee's fully unrolled organizational account |
| Scheduled clockings today | Employee Schedule | Number of clockings anticipated: 2 x number of non-break shift segments, except when segments about each other with no break. |

TABLE 3-continued

Extracted features

| Feature | Category | Description |
| --- | --- | --- |
| Hours since last scheduled start | Employee Schedule | Time since this employee's last shift was scheduled to start |
| Recent clockings | Employee Timekeeping | Number of clockings for this employee in the last 28 days |
| Clockings seen | Employee Timekeeping | Number of clockings this employee has made in all of their employment with this company |
| Employee specific miss rate | Employee Timekeeping | Average rate of missing clockings for this employee in the last 28 days |
| Employee's missing rate at this hour of the day | Employee Date/Time | The percent of clockings in the last 28 days that the employee missed, when they are scheduled at the same hour-of-day as the upcoming clocking |
| Employee clockings seen this hour | Employee Date/Time | Number of clockings this employee has made at this hour of the day in all of their employment with this company |
| Employee clockings seen this day of week | Employee Date/Time | Number of clockings this employee has made on this day of week in all of their employment with this company |
| Employee specific miss rate on this day of the week | Employee Date/Time | Average rate of missing clockings for this employee on this day of week in the last 28 days, defaulting to the employee average if it's the first shift on this day of the week |
| Hour of the clocking | Date/Time | Hour of day the clocking is scheduled to occur |

Additional features related to specific worker actions, such as the use of a particular card, clocking device, or location information can also be utilized in some embodiments. Such features capture information about the likelihood of a missed clocking when a worker is in a particular location, especially an unfamiliar one, or using a device they have not typically used before.

The feature extraction procedure, which takes a set of aligned timekeeping clockings and scheduled clockings is used in two different parts of the missing clocking prediction process (see Feature Extraction blocks in FIGS. 3 and 4). First, for the historical data used to train the machine learning model, every scheduled clocking is assessed to determine context at that moment in time (see FIG. 5). Similarly, during the prediction phase (see FIG. 6) feature extraction is performed on the scheduling and timekeeping data at the time of the prediction based on a target time of the scheduled clocking. In various embodiments, the feature extraction in the prediction phase may need to fill in default values for some of the features if predictions are being made too far in the future to properly instantiate them.

Missing Clocking Labeling

In order to calibrate the risk scoring model, historical data is not only annotated with features, but also with labels indicating, for each potential clocking, whether the clocking was missed or not. In some embodiments of the system, this procedure may be straightforward. For instance, if the timekeeping system logs scheduled clockings that do not have an associated clocking based on an existing pairing system, this information could be directly used as the labels for the historical data. However, general systems may not have such historical labels readily computed, and even if they do, the heuristics used to label these clockings as missing may not be appropriate for predicting the risk of future clockings. Therefore, in some embodiments of the system, the following heuristic matching procedure (labeled "matching" in FIGS. 4 and 5) procedure can be used to label clockings in the system as missed or not. Note, the procedure makes the assumption that all missing clockings are eventually entered into the system and therefore takes parameters corresponding to the before-edit clockings at some threshold for example the end of the day) and the final (after editing) clockings. The procedure utilizes the well-studied Hungarian Assignment Method [Harold W. Kuhn, "The Hungarian Method for the assignment problem", Naval Research Logistics Quarterly, 2: 83-97, 1955.] by building a cost matrix of time differences between possibly paired clockings between these two vectors.

LabelMissingClockings

Input:
   x=vector of clocking timestamps as they appeared at some threshold,
   y vector of clocking timestamps as they appeared in the final records, and
   HungarianAssignment procedure Output: label vector z with entries of 1 indicating the clocking was missed, else 0

Figure 5:
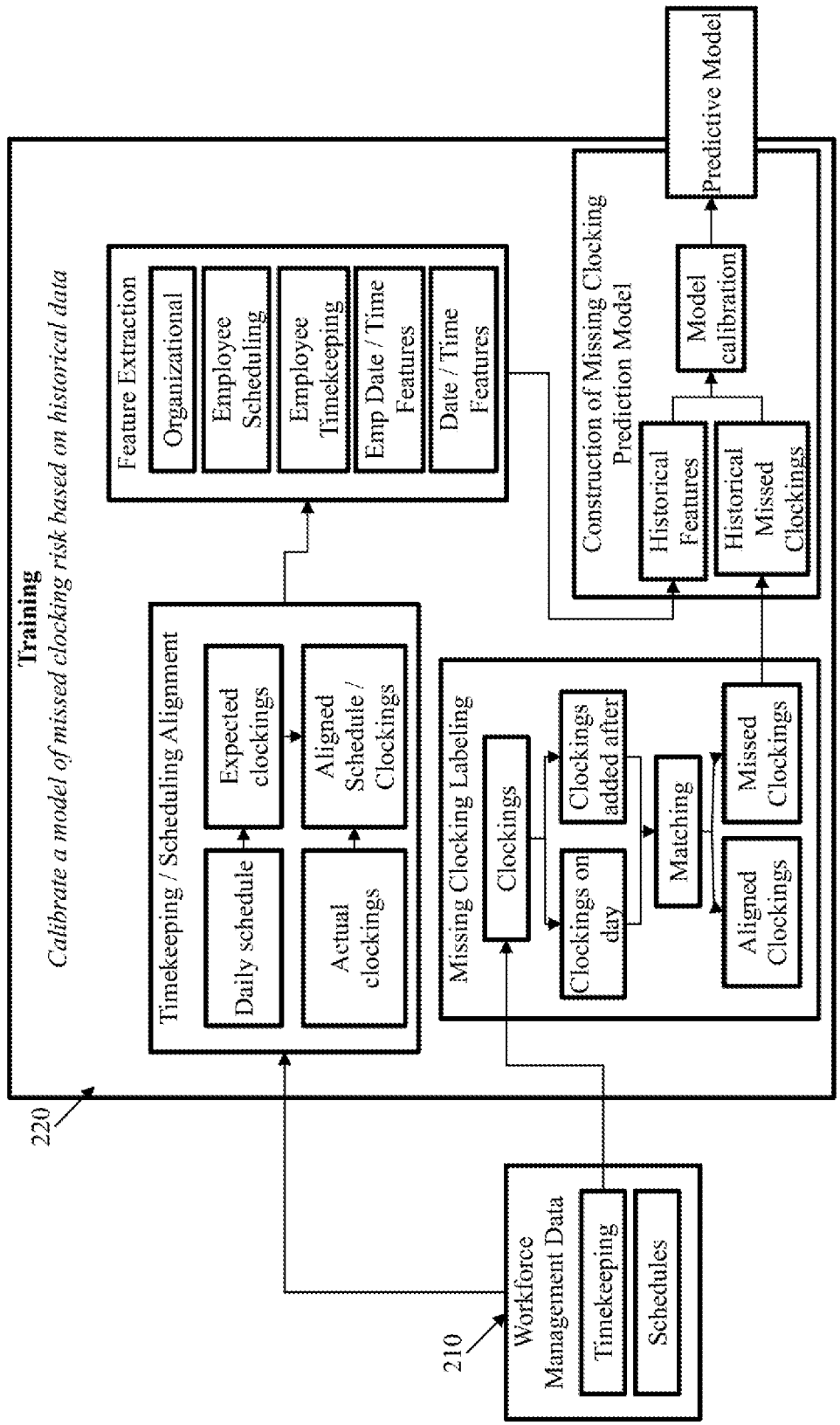
FIG. 5 highlights the Training portion of the system where the risk prediction model is calibrated based on historical data.
Figure 6:
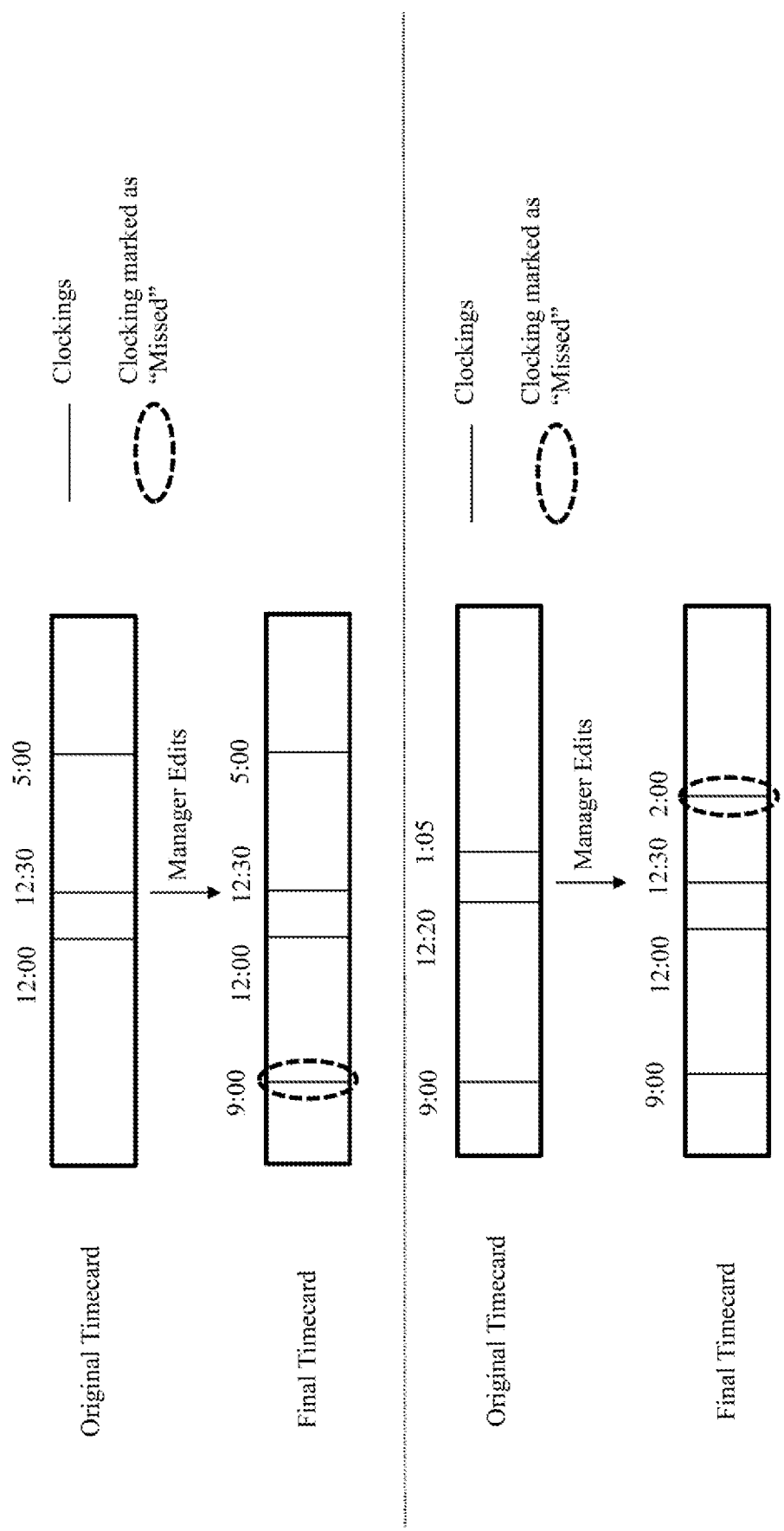
FIG. 6 illustrates examples of the heuristic missing clocking labeling procedure.

If length(x)>=length(y)
   Return z=vector of 0's of length(x) size
Else
   Build cost matrix M with entries:
      $M_{ij}=|x_i-y_j|$ for i,j<=length(x)
      $M_{ij}=0$ for length(x)<i<=length(y) and j<=length(y)
   matches=HungarianAssignment(M)
   Build z with
      $z_i$=1 If matches(y)>length(x)
      Else $z_i$=0
   Return z The procedure above essentially minimizes the total alignment difference between clockings that were entered on the day of the clocking and the final clockings. Any final clocking that is left unmatched is considered missing, while matched clockings are labeled as "aligned" (see Missing Clocking Labeling blocks in FIGS. 4 and 5). FIG. 6 illustrates two different examples where this procedure identifies a missing clocking. In the first example, no other clockings were edited so the new 9:00 clocking is marked as the missing one. In the second example, multiple clockings were edited, but the alignment in the procedure will identify the 2:00 clocking as missing and thereby minimize the alignment score. Utilizing this procedure and the feature extraction procedure on the historical data (see FIG. 5) provides the machine learning training procedure with a set of historical features and paired labels as to whether a scheduled clocking was missed or not. This information is then used to calibrate a model as described below.

Machine Learning and Construction of the Model

Figure 4A:
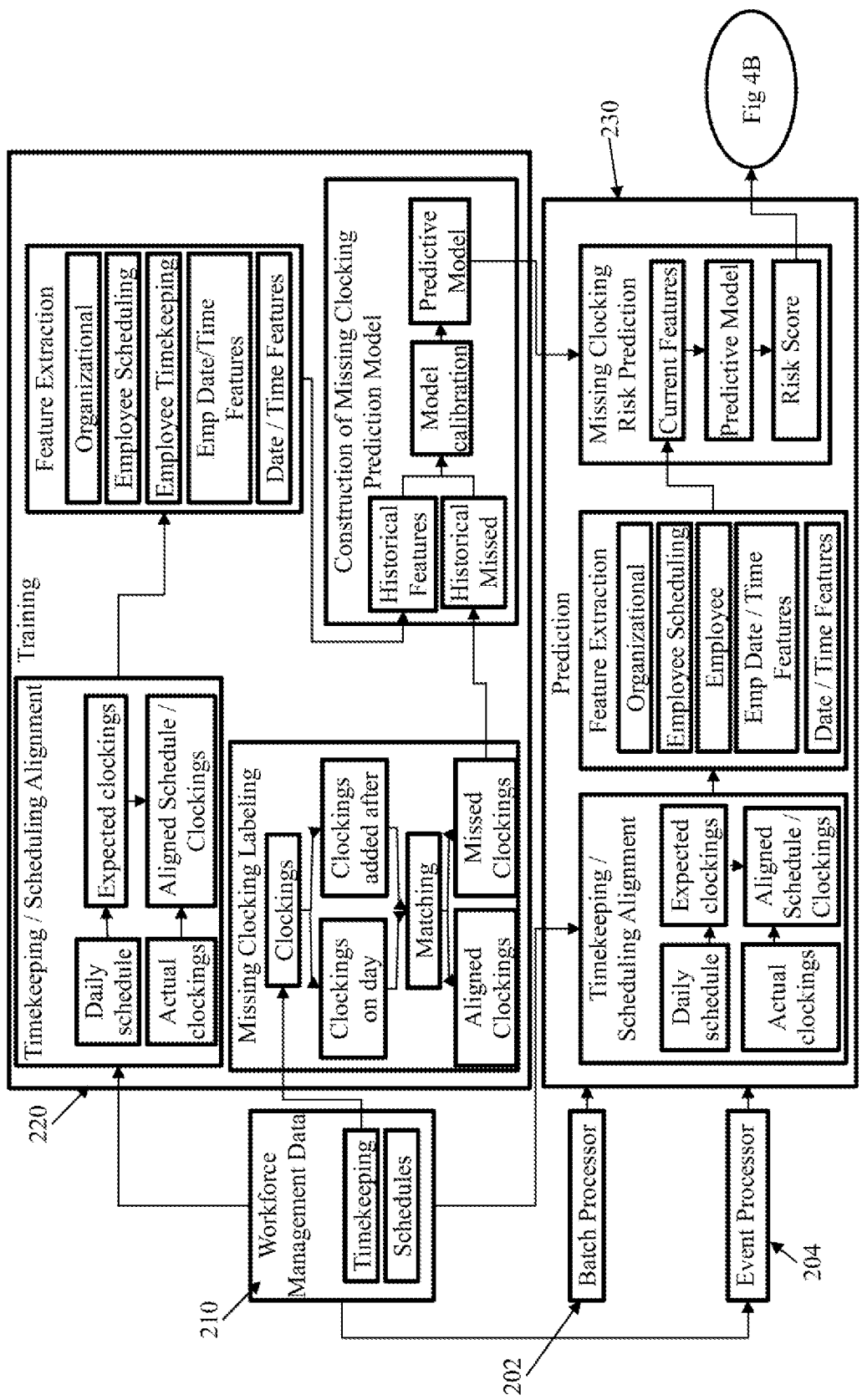
FIGS. 4A and 4B, collectively referred to as FIG. 4, illustrates the risk prediction and alerting system at a low-level.
Figure 4B:
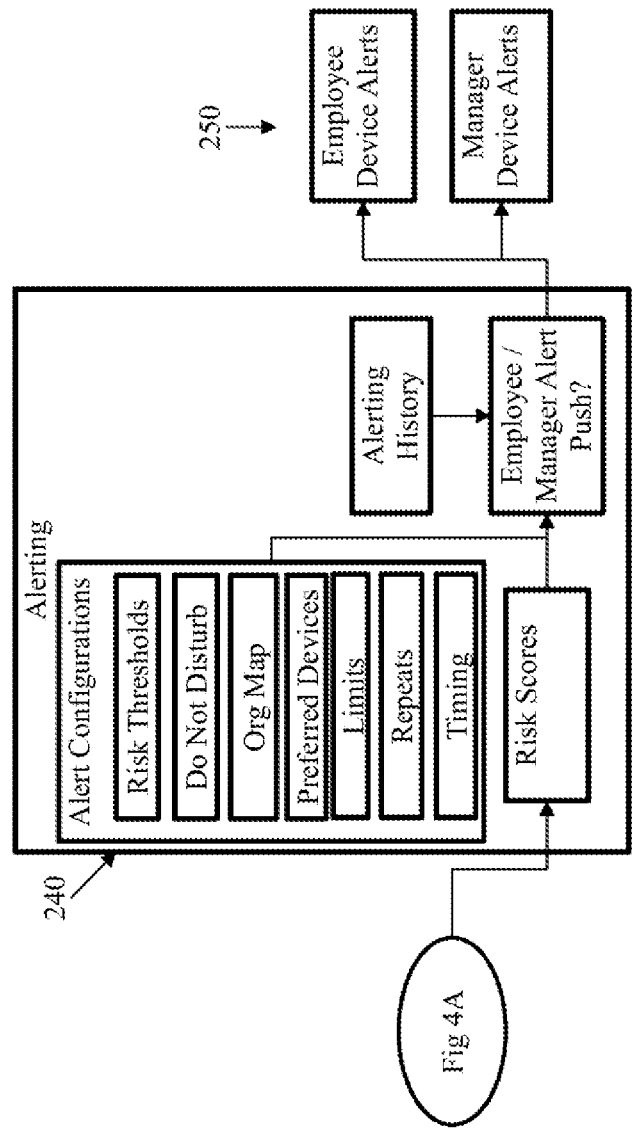

The final procedure in the training of a model for missing clocking risk based on historical data is to calibrate (or "fit") the model itself to the historical data. As illustrated in FIG. 5, this procedure takes as input the historical extracted features and the labeled missing clockings from the previous procedures. As shown in FIGS. 4A and 4B, collectively referred to as FIG. 4, the eventual output of this procedure is a model that will be used to predict future missing clocking risk. Many model representations and training procedures are available for this task. One, non-limiting example is a Gradient Boosted Decision Tree model described as follows:

TrainModel
Input:
data=feature data,
l=labels (1 for missed, 0 for properly executed),
n_rounds=number of boosting rounds to complete,
learning_rate=amount to update after each round, and
$L(y,\hat{y})$ =loss function comparing actual outcome vs. model prediction
Output: model=trained model $$model.stages[0] = \arg\min_c \sum_i L(y_i, c)$$

for i=1; i<n_rounds; i++
    grad=GetNegativeGradient($L$, data, l, model)
    tree=BuildTree(data, l, grad, $L$)
    model.stages [i]=tree For further detail on the fitting of Gradient Boosted Decision Trees see: Ridgeway, Greg. "Generalized Boosted Models: A guide to the gbm package." Update 1.1 (2007): 2007; and Friedman, Jerome, Trevor Hastie, and Robert Tibshirani. The elements of statistical learning. Vol. 1. Springer, Berlin: Springer series in statistics, 2001.

Irrespective of the specific type of model trained, it will be capable of turning a vector of features representative the context of a scheduled clocking into a risk score r(x) that is monotonically increasing in the probability that the upcoming scheduled clocking will be missed.

Predictions (Batch or Event Driven)

Figure 7:
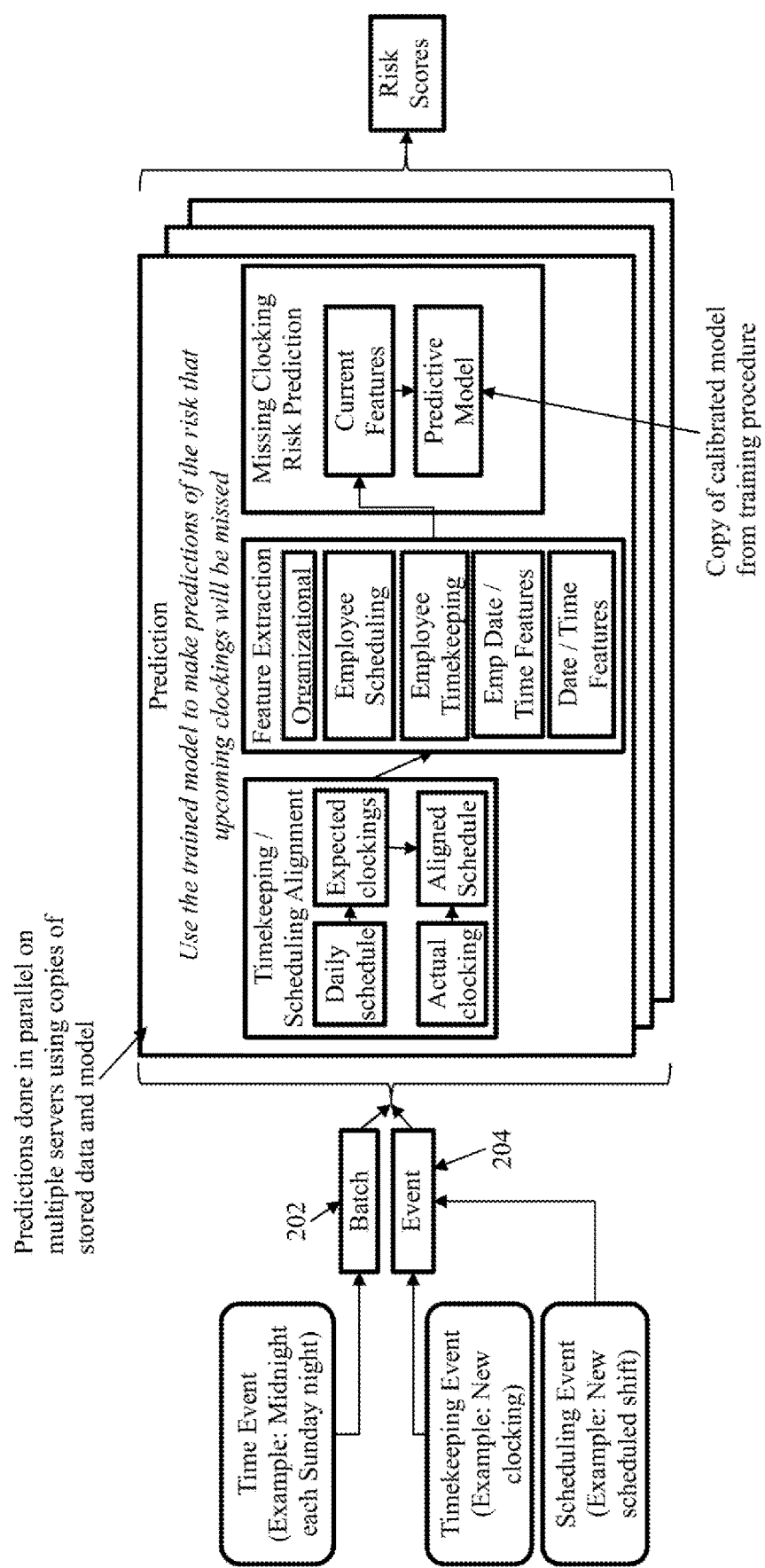
FIG. 7 illustrates the prediction portion of the system after the model is calibrated. Potential prediction triggers and the ability to make predictions on multiple servers are highlighted.

After the training phase, the calibrated model is deployed to score the risk of future scheduled clockings being missed (see FIGS. 3, 4 and 7). This deployment involves the saving of the model into computerized storage following the training process. In some embodiments, the model may be saved to multiple computer servers to allow for parallel processing of different potential clockings. The model is then loaded into a computer's memory whenever predictions are to be made.

Risk predictions for potential clockings can be made on many different timescales. Two non-limiting modes of prediction are an "online" mode that updates the features and risk of a missed clocking after every timekeeping and scheduling event or a "batch" mode where the next time period's (day's, week's, etc.) scheduled clockings are assessed once before the period starts. In either case, once the prediction process is invoked, the same steps are followed, as seen in FIG. 7. Specifically, the same timekeeping and scheduling alignment that was performed on historical data is applied to the current data and the upcoming potential clockings indicated on the schedule. After this alignment, the same features described above in the training phase are calculated for the upcoming scheduled clockings. Finally, these features are fed to the trained model, which outputs a risk score for each of the upcoming scheduled clockings. Note that these features can vary based on the mode of prediction; same-day missed clockings may be present in the online mode, but not if done in batch mode on the prior day.

The online prediction procedure is invoked by an event processor that detects a relevant event in the timekeeping and scheduling system. This event could, for example, be a new scheduled shift, indicating a new set of potential clockings to be evaluated for risk. Another example of an invoking event is a new clocking or missed clocking by a worker, which changes the feature values calculated during prediction. In addition, worker actions, either within the timekeeping or scheduling systems, or in other connected systems, including computer log-ins, or the use of various hardware or other devices could trigger a risk assessment. Any such event that either requires a new set of potential clockings to be scored, or changes the features around an existing scheduled shift, requires the corresponding clockings to be re-scored under the online model. In some embodiments, this extensive processing could be accomplished in a distributed computing system utilizing multiple copies of the trained model, as seen in FIG. 7.

The batch prediction procedure is, in some embodiments, invoked not by a specific timekeeping or scheduling event, but by a timed event, such as a daily invocation at midnight, a weekly invocation on a Sunday, or a periodic procedure tied to a business calendar, such as the typical day of schedule posting. Once the batch prediction process is invoked, all scheduled clockings within a given time period are scored at once using available information and the prediction pipeline described above. As with the online prediction mode, some embodiments may use multiple copies of the trained model and invoke prediction on multiple servers to parallelize and speed up the task.

Alert Configurations

Figure 8:
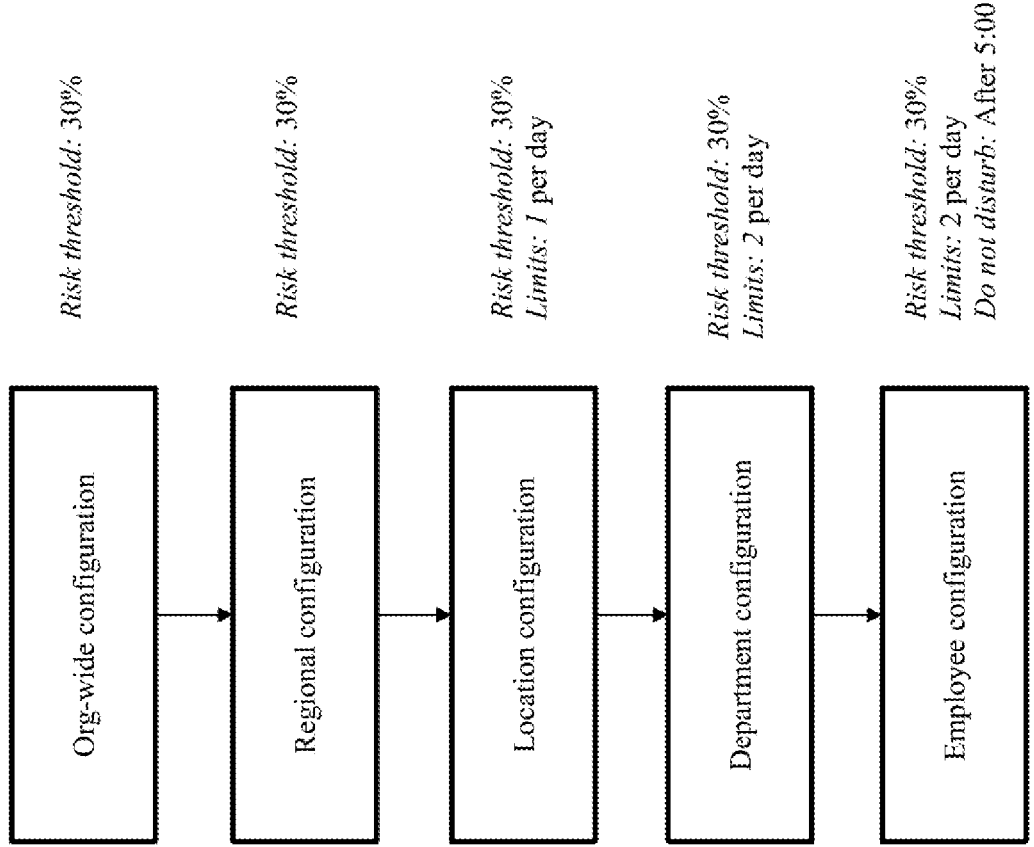
FIG. 8 illustrates the cascading of alert configurations down the organizational chart.

Once each scheduled clocking is assigned a risk score in the prediction phase, the system produces alerts based on the scores, as well as the alert histories. Configuration settings are used to control how often such alerts are sent and are crucial to ensure the alerts do not overwhelm workers or managers (for instance reducing false positives). In some embodiments, these configurations can be set at various organizational levels such as for specific employees, employee groups, managers, manager groups, departments, locations, or regions. The configurations set at each level cascade down to lower levels unless they are superseded by more specific configurations. Note the higher levels can contain partial specifications as well. This cascading of configuration properties is illustrated in FIG. 8.

Figure 10:
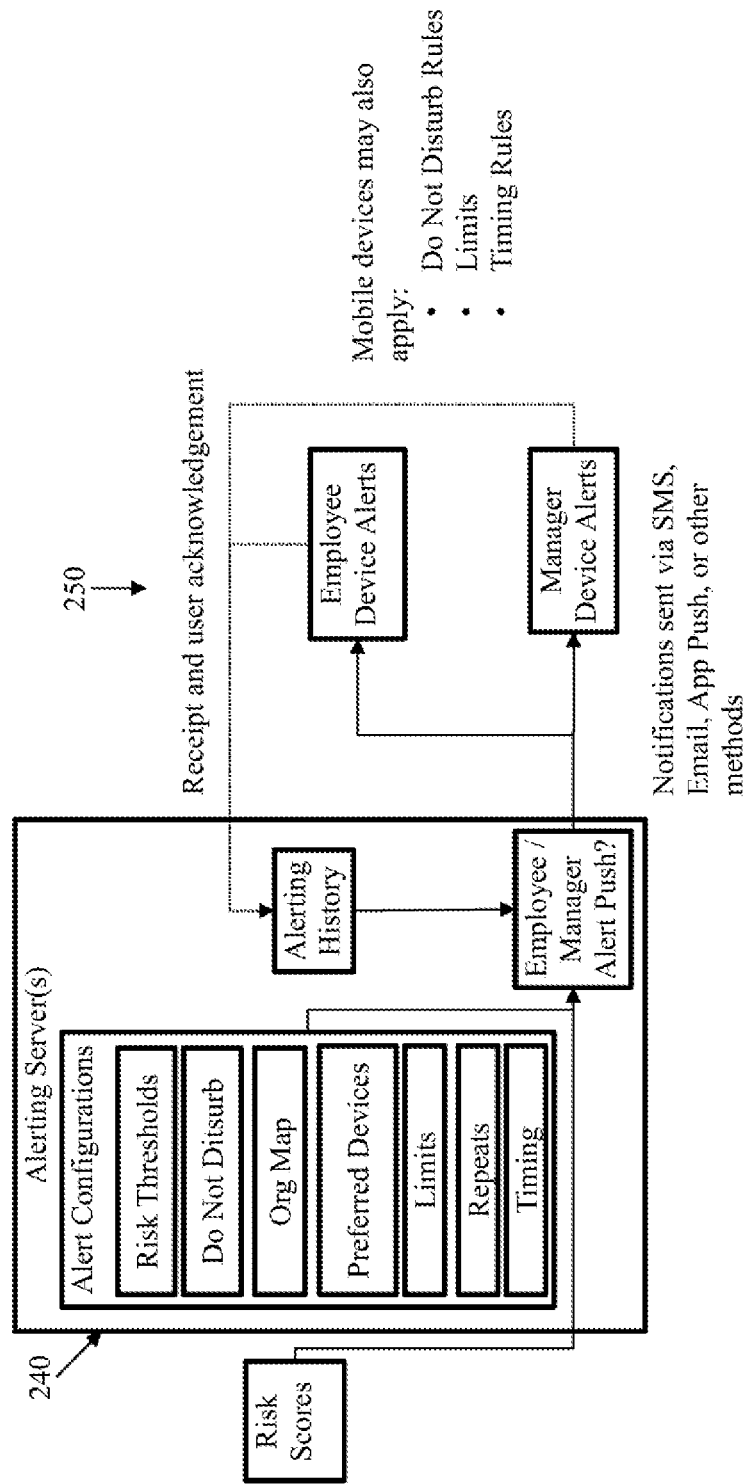
FIG. 10 illustrates aspects of the alerting portion of a system in accordance with an embodiment.

The non-limiting alert configurations in at least one embodiment include the following elements in table 4, which are referred to as Alert Configurations in FIG. 10:

TABLE 4

Alert Configurations

| Configuration | Description |
|---|---|
| Organizational map | Specifies what managers and organizational configurations apply to each employee. |
| Risk threshold | Risk scores below this threshold do not trigger alerts |
| Severity Rules | Indicates the immediacy or impact of an alert based on its timing, shift, employee, and risk of a missed clocking. May be used to route alerts to specific devices or individuals. |
| Do not disturb | Blocks alerts to specific users or devices for a period of time. Blocking may be specific to certain severity levels. |
| Timing | Limits the timing of alerts to particular days, times of day, or other aspects of day/time. These limits may be device specific and may be severity based. |
| Limits | Specifies limits on how many alerts can be sent within a certain timeframe or within a specific shift. These limits may be device specific and may be severity based. |
| Additional Recipients | Specifies if one or more managers should also receive the alert, potentially based on its severity |
| Preferred Methods and Devices | May include, but not limited to, forms of communication such as SMS message, email, or phone call and devices including mobile phones, tablets, laptop computers, desktops, and other devices |
| Repeat | Specifies how often alerts should be repeated until acknowledged in some manner |

Preferred methods and devices indicate, for each worker or manager, what combination of method and device, for instance SMS/Phone, App-Push/Tablet, or Email/All-Devices should be used to deliver standard messages. However, in some embodiments, the severity of the alert may over-ride these preferences (see FIG. 9). Furthermore, in some embodiments, the devices and methods for a manager alert may be different than those used for the employee, since they are constructed from the manager's profile (in accordance with FIG. 8). A non-limiting example instantiation of preferred methods and devices for varying severity types is shown in FIG. 9. In some embodiments (such as shown in FIG. 10), the configurations listed above can be used in the following non-limiting procedure to determine what alerts to send based on the generated risk score and alerting history for the employee.

ProcessAlert
Input:
risk score r for scheduled clocking c in shift s for employee e,
alert history h for employee e and their manager(s),
Organizational map o,
current time t, and
configurations confs
Output: alerts to specific devices and workers/managers
con_e=cascade(confs, e, o)//configuration for this employee
sev=con_e[SeverityRules(r,c,s,e,o)]//severity of alert
recs={con_e[AdditionalRecipients(sev)]+e}//recipients
for rec in recs
   con=cascade(confs, rec, o)//configuration for this recipient
   [methods,devices]=getMethodDevice(sev, con[PreferredMethod])//use preferred and others determined by severity
   if r>con[threshold] AND NOT blocked(con[DoNotDisturb], t, sev, dev) AND NOT blocked(con[Timing], sev, dev, c) AND NOT blocked(con[Limits], c, h, s, sev, dev)
     tries=0
     while NOT acknowledged AND tries<con[Repeat]
       Send Alert(c,s,e,r) to rec by methods on devices
       tries++

This procedure checks the severity of each alert, which may be, in some embodiments, determined by a combination of the risk score, time and day of the shift, and the current day and time. The procedure uses this severity to determine the recipients and methods/devices for the alerts, checks the other conditions for filtering alerts based on blocks, timing, and limits, taking into account the severity and devices, and then attempts to send repeated alerts until they are acknowledged.

The procedure above states the logic of processing alert configurations, but many of the steps can be performed either on the alerting server(s) or on mobile devices themselves. In particular, the processing of Do not Disturb rules, Limit rules, and Timing rules, could all be done on the device they are delivered to, assuming proper synchronization with the current alerting history.

Delivering Alerts to Mobile and Other Devices

Once the alerts are determined based on the algorithm above, they can be delivered to the selected devices based on the method selected. These methods include any of the following non-limiting approaches, also illustrated in FIG. 10:

SMS text messages

Mobile App Push Notifications

Electronic Mail

Automated Phone Call

These alerts may be delivered to many types of devices, including but not limited to mobile phones, tablets, laptop computers or desktop terminals. These alerts may, in some embodiments, be sent to a device prior to the alert actually surfacing, or the alert may surface as soon as it is received. This functionality is of benefit when system access may be unavailable near the time that the reminder would be sent, for instance if the device communicates only through Wi-Fi and the employee commutes to work on a path without a Wi-Fi connection. In some embodiments, the alerts sent to individual workers may contain the information detailed in table 5.

TABLE 5

Alert information

| Information | Description |
| --- | --- |
| Expected Clocking Time and Scheduled Shift | Scheduling information for the upcoming clocking, including the day, time, and associated shift |
| Organization-configured text | Text specified by the organization to brand or personalize the alert |
| Risk Score or Reasoning | Information about the severity or assessed risk of the missing clocking, or the reasons why the system determined the risk was high |
| Response Options | Acknowledgement of action by the user in response to the alert. Non- limiting examples include "OK" (acknowledged), "Clock Now" (to enter a Clocking immediately), or "Request Absence" |
| Delivery Time | Time the alert should be delivered, with a default of "immediately", but allowing for delays to make the alert as useful as possible. |

In some embodiments, alerts sent to managers contain all of the information listed above as well as the name of the employee who has a high risk of missing a clocking. The information above can, in some embodiments, be processed into natural language sentences such as "This is a reminder to clock at 9:00 am on Monday" using organization-specific templates that combine multiple pieces of information. The response options included in the alert allow an employee or a manager to acknowledge the receipt of the alert and potentially take another action. The possible actions may be limited by timekeeping business rules. For instance, a "Clock Now" action may not be allowed until within a certain time before the shift starts. In some embodiments, the system will continue to send repeated alerts to devices until an acknowledgement is received or until the number of repeats stipulated in the individual's configuration is exceeded. As noted in the feedback loop in FIG. 10, these responses can also be recorded in a user's alert history.

These alerts represent the end point of the system, which uses historical data to calibrate a missing clocking risk predictor. The predictor is used in either an online or batch mode to predict the risk of workers missing upcoming scheduled clockings. Based on these risk scores and system configurations, alerts are generated for employees and managers reminding them about the upcoming clockings.

As described above, various embodiments provide a method, apparatus and computer program(s) to provide alerts prior to potential missed clockings.

Figure 11:
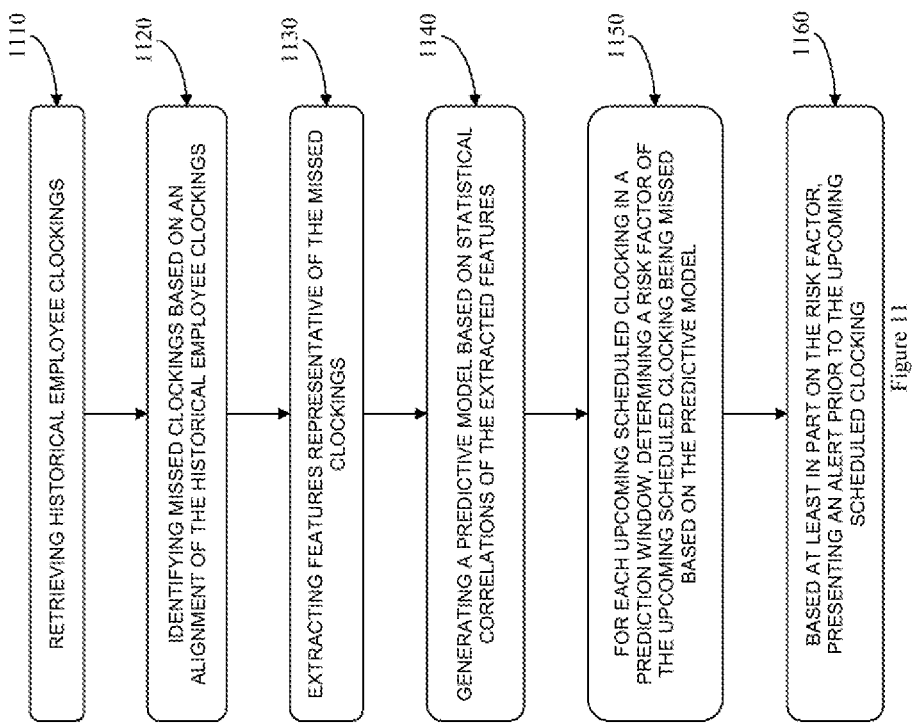
FIG. 11 is a logic flow diagram that illustrates the operation of a method, and a result of execution of computer program instructions embodied on a computer readable memory, in accordance with various embodiments.

FIG. 11 is a logic flow diagram that illustrates a method, and a result of execution of computer program instructions, in accordance with various embodiments.

In accordance with an embodiment a method performs, at Block 1110, a step of retrieving historical employee clockings. Missed clockings are identified/labeled based on an alignment of the historical employee clockings at Block 1120. At Block 1130, a step of extracting features representative of the missed clockings is performed. The method performs, at Block 1140, a step of generating a predictive model based on statistical correlations of the extracted features. At Block 1150, for each upcoming scheduled clocking in a prediction window, a risk factor of the upcoming scheduled clocking being missed is determined based on the predictive model. The method also performs a step of presenting an alert prior to the upcoming scheduled clocking based at least in part on the risk factor at Block 1160.

The various blocks shown in the Figures may be viewed as method steps, as operations that result from use of computer program code, and/or as one or more logic circuit elements constructed to carry out the associated function(s).

An embodiment provides a method for signaling alerts prior to potential missed clockings. The method includes retrieving historical employee clockings and identifying missed clockings based on an alignment of the historical employee clockings. Features representative of the missed clockings are extracted and a predictive model is generated based on statistical correlations of the extracted features. For each upcoming scheduled clocking in a prediction window, a risk factor of the upcoming scheduled clocking being missed is determined based on the predictive model. The method also includes presenting an alert prior to the upcoming scheduled clocking based at least in part on the risk factor.

A further embodiment provides an apparatus for signaling alerts prior to potential missed clockings. The apparatus includes at least one processor and at least one memory storing computer program code. The at least one memory and the computer program code are configured to, with the at least one processor, cause the apparatus to perform actions. The actions include to retrieve historical employee clockings and to identify missed clockings based on an alignment of the historical employee clockings. Features representative of the missed clockings are extracted and a predictive model based on statistical correlations of the extracted features is generated. For each upcoming scheduled clocking in a prediction window, a risk factor of the upcoming scheduled clocking being missed is determined based on the predictive model. The actions also include to present an alert prior to the upcoming scheduled clocking based at least in part on the risk factor.

In another embodiment of the apparatus above, the apparatus is embodied in a web-based server.

In a further embodiment of any one of the apparatus above, the apparatus is embodied in an integrated circuit.

A further embodiment provides a computer readable medium tangibly encoded with a computer program for signaling alerts prior to potential missed clockings. The computer program is executable by a processor to perform actions. The actions include retrieving historical employee clockings and identifying missed clockings based on an alignment of the historical employee clockings. Features representative of the missed clockings are extracted and a predictive model based on statistical correlations of the extracted features is generated. For each upcoming scheduled clocking in a prediction window, a risk factor of the upcoming scheduled clocking being missed is determined based on the predictive model. The actions also include presenting an alert prior to the upcoming scheduled clocking based at least in part on the risk factor.

In another embodiment of the computer readable medium above, the computer readable medium is a non-transitory computer readable medium (e.g., CD-ROM, RAM, flash memory, etc.).

In a further embodiment of any one of the computer readable media above, the computer readable medium is a storage medium.

Various operations described are purely exemplary and imply no particular order. Further, the operations can be used in any sequence when appropriate and can be partially used. With the above embodiments in mind, it should be understood that additional embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. A method for providing alerts prior to potential missed clockings, the method comprising:
   retrieving, via at least one processor, historical employee clockings data;
   identifying, via the at least one processor, missed clockings based on an alignment of the historical employee clockings data;
   extracting, via the at least one processor, labels each of which identifies one of the missed clockings as having been missed;
   extracting, via the at least one processor, features representative of the missed clockings;
   generating, via the at least one processor, a machine-learning-based predictive model trained to generate a risk score based at least in part on the labels and statistical correlations of the extracted features, the risk score indicative of a likelihood that a scheduled clocking will be missed;
   calculating, via the at least one processor, the extracted features for an upcoming scheduled clocking within a prediction window;
   generating, via the at least one processor using the machine-learning-based predictive model and based at least in part on the calculated extracted features, a risk score for the upcoming scheduled clocking;
   determining, via the at least one processor and based at least in part on the risk score, that an alert corresponding to the upcoming scheduled clocking should be presented; and
   presenting, via an electronic device, the alert prior to an occurrence of the upcoming scheduled clocking;
   wherein:
      generating a risk score for the upcoming scheduled clocking is performed in response to at least one of: a schedule being posted, a schedule being updated, or a missed clocking,
      extracting features representative of the missed clockings comprises identifying an employee's miss rate for at least one clocking based at least in part on a location, and
      the alert includes a response option that provides for the employee to clock in.

2. The method of claim 1, wherein identifying missed clockings further comprises:
   comparing scheduled clockings from a historical employee schedule against actual clockings from the historical employee clockings data in order to identify missed clockings.

3. The method of claim 2, wherein a scheduled clocking with no associated actual clocking within an allowable buffer for matching is identified as a missed clocking.

4. The method of claim 1, wherein generating a risk score for the upcoming scheduled clocking comprises identifying each upcoming and scoring scheduled clocking in a given timeframe.

5. The method of claim 4, wherein the timeframe represents the next day.

6. The method of claim 1, wherein presenting an alert further comprises:
   determining whether the risk score meets a given threshold for an associated user; and
   in response to the risk score meeting the given threshold, alerting the associated user prior to the upcoming scheduled clocking.

7. The method of claim 6, wherein the upcoming scheduled clocking is associated with the employee, and the associated user is the employee.

8. The method of claim 1, wherein presenting the alert comprises repeating the alert unless a user acknowledgement is received.

9. The method of claim 1, wherein presenting the alert is performed in accordance with alert configurations.

10. The method of claim 1, wherein extracting features representative of the missed clockings further comprises:
    identifying an employee's miss rate for at least one of:
       clockings within a recent time period,
       all historical clockings,
       clockings at a given time of day, or
       clockings on a given day of the week.

11. The method of claim 1, wherein extracting features representative of the missed clockings is performed in parallel on multiple servers.

12. An apparatus for providing alerts prior to potential missed clockings, the apparatus comprising:
    at least one processor; and
    at least one memory including computer program code, the at least one memory and the computer program code configured to, with the at least one processor, cause the apparatus to perform at least the following:
       retrieve historical employee clockings data;
       identify missed clockings based on an alignment of the historical employee clockings data;
       extract labels each of which identifies one of the missed clockings as having been missed;

extract features representative of the missed clockings via identifying an employee's miss rate for at least one clocking based at least in part on a location;

generate a machine-learning-based predictive model trained to generate a risk score based at least in part on the labels and statistical correlations of the extracted features, the risk score indicative of a likelihood that a scheduled clocking will be missed;

calculate the extracted features for an upcoming scheduled clocking within a prediction window;

generate, using the machine-learning-based predictive model, a risk score for the upcoming scheduled clocking based at least in part on the calculated extracted features, and in response to at least one of: a schedule being posted a schedule being updated, or a missed clocking;

determine, based at least in part on the risk score, that an alert corresponding to the upcoming scheduled clocking should be presented; and present, via an electronic device, the alert prior to an occurrence of the upcoming scheduled clocking, wherein the alert includes a response option that provides for the employee to clock in.

13. The apparatus of claim 12, wherein presenting an alert comprises:
determining whether the risk score meets a given threshold for an associated user; and
in response to the risk score meeting the given threshold, alerting the associated user prior to the upcoming scheduled clocking.

14. The apparatus of claim 12, wherein the apparatus comprises:
a plurality of processors;
wherein extracting features representative of the missed clockings is performed in parallel on the plurality of processors.

15. A non-transitory computer-readable medium tangibly encoded with a computer program for providing alerts prior to potential missed clockings, the computer program executable by a processor to perform actions comprising:
retrieving historical employee clockings data;
identifying missed clockings based on an alignment of the historical employee clockings data;
extracting labels each of which identifies one of the missed clockings as having been missed;
extracting features representative of the missed clockings;
generating a machine-learning-based predictive model trained to generate a risk score based at least in part on the labels and statistical correlations of the extracted features, the risk score indicative of a likelihood that a scheduled clocking will be missed;
calculating the extracted features for an upcoming scheduled cocking within a prediction window;
generating, using the machine-learning-based predictive model and based at least in part on the calculated extracted features, a risk score for the upcoming scheduled clocking, wherein generating the risk score is in response to at least one of a schedule being posted, a schedule being updated, or a missed clocking;
determining, based at least in part on the risk score, that an alert corresponding to the upcoming scheduled clocking should be presented; and
presenting, via an electronic device, the alert prior to an occurrence of the upcoming scheduled clocking;
wherein the alert includes a response option that provides for an employee to clock in.

16. The non-transitory computer-readable medium of claim 15, wherein presenting an alert comprises:
determining whether the risk score meets a given threshold for an associated user; and
in response to the risk score meeting the given threshold, alerting the associated user prior to the upcoming scheduled clocking.

17. The method of claim 1, wherein generating the machine-learning-based predictive model is based at least in part on a Gradient Boosted Decision Tree.

18. The method of claim 17, wherein the machine-learning-based predictive model is structured to receive the calculated extracted features as a vector.

19. The method of claim 18, wherein:
the employee clockings data corresponds to an employee; and
the calculated extracted features include an average rate missed clockings rate of the employee.

20. The method of claim 19, wherein the extracted features further include an average rate of missed clockings for an organization level corresponding to an employee.

21. The method of claim 20, wherein the extracted features further include a specific miss rate for a day of the week.

22. The method of claim 21, wherein the alert includes the risk score.

23. The method of claim 22, wherein the prediction window corresponds to a duration of about a week that occurs in the future.

* * * * *

UNITED STATES PATENT AND TRADEMARK OFFICE
CERTIFICATE OF CORRECTION

| | |
|---|---|
| PATENT NO. | : 11,715,070 B2 |
| APPLICATION NO. | : 16/381472 |
| DATED | : August 1, 2023 |
| INVENTOR(S) | : Scarpati et al. |

It is certified that error appears in the above-identified patent and that said Letters Patent is hereby corrected as shown below:

In the Drawings

Sheet 10 of 12, Fig. 9, delete "Persona" and insert --Personal-- therefor

In the Specification

In Column 9, Line 34, delete "$grad=GetNegativeGradient(L$," and insert --$grad = GetNegativeGradient(L$,-- therefor In the Claims Column 17, Line 15, in Claim 12, after "posted", insert --,--

Signed and Sealed this
Twentieth Day of February, 2024

Katherine Kelly Vidal
*Director of the United States Patent and Trademark Office*